May 21, 1957 W. G. HOLZ 2,792,928
ATTACHMENT CLIP FOR LUMBER CONVEYOR CHAINS
Filed March 28, 1955
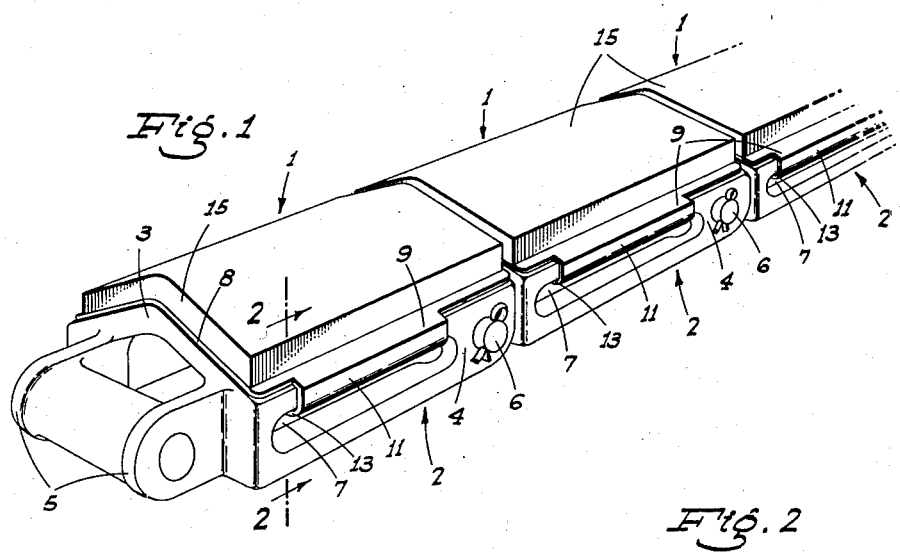
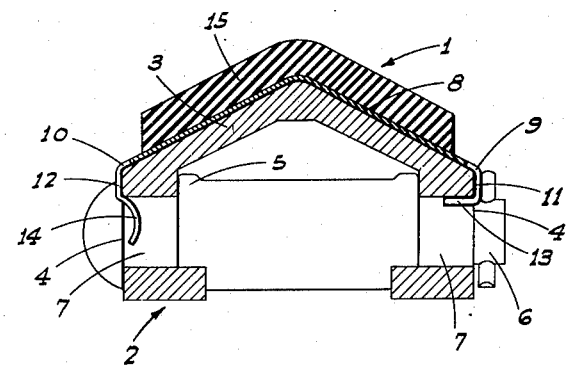
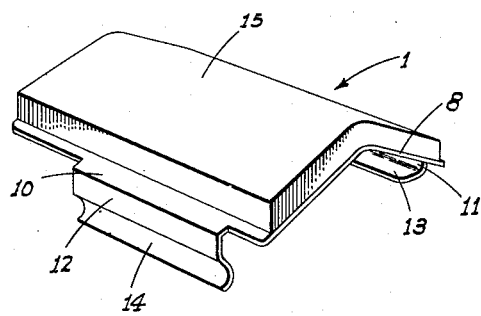
INVENTOR
William G. Holz
BY Webster & Webster
ATTYS.

United States Patent Office 2,792,928
Patented May 21, 1957

2,792,928

ATTACHMENT CLIP FOR LUMBER CONVEYOR CHAINS

William G. Holz, Lodi, Calif.

Application March 28, 1955, Serial No. 497,252

4 Claims. (Cl. 198—189)

This invention relates to, and it is a major object to provide, a novel material supporting clip adapted for attachment to each link of endless conveyor chains; the clip being especially adapted—but not limited—for use on lumber conveyor chains.

In the manufacture of lumber it is the practice to transfer the same from point to point by means of transversely spaced endless metallic link chains; the lumber resting on and spanning between the upper runs of such chains. At times, and for various reasons, the moving chains may advance under the lumber, which results in the metallic links scoring or otherwise damaging such lumber; this being especially undesirable when the lumber is of finished grade.

It is therefore another important object of this invention to provide a novel attachment clip, for each link of such chains, which includes a resilient pad disposed to engage and support the lumber; each such pad assuring that the lumber will not be damaged upon occurrence of relative motion between the chains and the lumber carried thereby, and also the pads produce a better frictional contact between the chains and lumber, whereby to minimize chain slippage.

An additional object of this invention is to provide an attachment clip, for the purpose described, which can be readily snap-engaged on a chain link, and thereafter remain firmly but quick-detachably secured in place on the link.

Thus, a set of clips can be placed on an endless chain, and subsequently detached for replacement, both in a quick and facile manner.

It is also an object of the invention to provide an attachment clip which is designed for ease and economy of manufacture.

Still another object of the invention is to provide a practical, reliable, and durable attachment clip, and one which will be exceedingly effective for the purpose for which it is designed.

These objects are accomplished by means of such structure and relative arrangement of parts as will fully appear by a perusal of the following specification and claims.

In the drawings:

Fig. 1 is a fragmentary perspective view of the upper run of an endless chain showing the attachment clips in place on the links.

Fig. 2 is a transverse sectional elevation on line 2—2 of Fig. 1.

Fig. 3 is a perspective view of one of the clips, detached.

Referring now more particularly to the drawings and to the characters of reference marked thereon, the attachment clip, which is the subject of this invention, is indicated generally at 1 and is adapted for use on a link, indicated generally at 2, of an endless conveyor chain; one clip being used on each link of the chain.

The links 2 each include—with reference thereto when in the upper run of the conveyor—a solid top 3 which is rectangular in plan; depending sides 4; and—at one end—longitudinally projecting trunnions 5 which project into, and are hinged to, the next section by means of a transverse pivot pin 6.

The solid top 3 of each link 2 is tapered from a longitudinal center line in opposite directions at a downward and outward incline; i. e. the upper surface of the top 3 being of inverted, wide angle V-shape, as shown.

The sides 4 of each link 2 are formed with a longitudinal slot 7 which is elongated and disposed ahead of the related pivot pin 6.

The attachment clip 1 for each link 2 comprises a mounting plate 8 adapted to engage in matching relation on the top 3 of the link; such plate being substantially the length of said top, but slightly narrower.

On opposite sides and in vertical alinement with the slots 7 the plate 8 is formed with relatively narrow, lateral projections 9 and 10; such projections being formed at their outer edges with integral, depending skirts 11 and 12, respectively. The lateral projections 9 and 10 dispose the skirts 11 and 12 so that they lie flush against the outer face of the sides 4 above the slots 7 when the clip 1 is in place on a link 2.

The skirts 11 and 12 depend to the upper edge of the related longitudinal slot 7; the skirt 11 being formed, at its lower edge, with an integral hook flange 13 which extends inwardly and in right-angle relationship to said skirt 11.

The skirt 12 is formed, at its lower edge, with an integral, depending, inwardly bowed spring tongue 14.

The skirt 11 and flange 13 define a hook which engages the portion of the related side 4 above the corresponding slot 7 when said flange 13 extends into the latter. To apply the described clip 1 to a link 2, the hook is drawn into engagement with one side of the link, as above, and then the clip is swung downward until the tongue 14 snap-engages in the adjacent longitudinal slot 7; such tongue thereafter effectively but quick-detachably maintaining the clip in symmetrically seated relation on the top 3.

To quick-detach the clip it is only necessary that a suitable tool, such as a screw driver, be inserted in the related slot 7 and the spring tongue 14 urged outwardly and upwardly until it clears the side 4 of the link above such slot.

The mounting plate 8 of each clip is fitted on top with a conforming rubber pad 15 vulcanized to said plate; such pad being of substantial thickness and the rubber being relatively hard but resilient.

With a set of the described clips attached to each of the endless chains of a lumber conveyor, the lumber rests on the rubber pads 15, so that under no circumstance can the chain damage the lumber even though there be forward slippage of such chain beneath said lumber. It should also be noted that the rubber pads 15 afford a greater frictional contact with the supported lumber, whereby to more effectively advance the same.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A material engaging attachment clip for a chain link having depending sides each provided with a recess therein; said clip comprising a plate to extend over and seat on the link, a cushion pad on the plate, a depending inwardly opening hook on one side of the plate to engage in the recess in one side of the link and in contact with the wall of the recess nearest the plate, and a depending spring tongue on the other side of the plate to engage in the recess of the related chain side in contact with the wall of said recess nearest the plate.

2. A material engaging attachment clip for a chain link having depending sides each provided with an elongated longitudinal recess therein; said clip comprising a plate extending over and seated on top of the link and having a cushion pad thereon, integral skirts depending from opposite side edges of the plates and resting flush against the opposite sides of the link above the corresponding recesses, an elongated hook flange integral with one skirt and extending into the related recess in engagement with the upper wall thereof, and a spring tongue integral with the other skirt in depending relation and snap-engaged in the related recess.

3. A clip, as in claim 2, in which the lower end of the tongue terminates short of the lower edge of the recess sufficient to provide for the entry of a tongue pry-out tool into the recess below the tongue.

4. A material engaging attachment clip for a chain link having depending sides each provided with a recess therein; said clip comprising a plate to extend over and seat on the link, a cushion pad on the plate, and elements on opposite sides of the plates integral therewith to detachably engage in the related recesses and arranged to releasably retain the plate in contact with the link and against movement therefrom in a direction at right angles thereto.

References Cited in the file of this patent

UNITED STATES PATENTS

| | | |
|---|---|---|
| 764,246 | Levalley | July 5, 1904 |
| 2,149,776 | Knoerzer | Mar. 7, 1939 |
| 2,303,587 | Snyder | Dec. 1, 1942 |